United States Patent
Osada

(10) Patent No.: US 11,226,981 B2
(45) Date of Patent: Jan. 18, 2022

(54) STORE MERGE APPARATUS, STORE CONTROL METHOD, AND RECORDING MEDIUM FOR RECORDING COMPUTER PROGRAM

(71) Applicant: NEC Platforms, Ltd., Kawasaki (JP)

(72) Inventor: Takashi Osada, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 913 days.

(21) Appl. No.: 15/777,688

(22) PCT Filed: Dec. 9, 2016

(86) PCT No.: PCT/JP2016/086736
§ 371 (c)(1),
(2) Date: May 21, 2018

(87) PCT Pub. No.: WO2017/104572
PCT Pub. Date: Jun. 22, 2017

(65) Prior Publication Data
US 2018/0341690 A1    Nov. 29, 2018

(30) Foreign Application Priority Data

Dec. 14, 2015  (JP) .............................. JP2015-243209

(51) Int. Cl.
*G06F 16/27* (2019.01)
*G06F 3/06* (2006.01)
(Continued)

(52) U.S. Cl.
CPC .............. *G06F 16/27* (2019.01); *G06F 3/061* (2013.01); *G06F 3/0656* (2013.01);
(Continued)

(58) Field of Classification Search
CPC ....................................................... G06F 16/27
(Continued)

(56) References Cited

U.S. PATENT DOCUMENTS 5,692,150 A    11/1997  Moriyama et al.
2013/0013853 A1*  1/2013  Yeh ..................... G06F 12/0246
                                                                711/103
(Continued)

FOREIGN PATENT DOCUMENTS

JP    H08-44626 A      2/1996
JP    2012-043202 A    3/2012
(Continued)

OTHER PUBLICATIONS

Extended European Search Report for EP Application No. EP16875552.8 dated Jul. 8, 2019.
(Continued)

*Primary Examiner* — Kimberly L Wilson
(74) *Attorney, Agent, or Firm* — Sughrue Mion, PLLC

(57) ABSTRACT

The store merge apparatus is provided with a processor and a storage storing a plurality of entries that include a plurality of blocks and entry merge state information that represents, for each group into which the plurality of entries are divided, the state of merge in the plurality of entries, the plurality of entries and the entry merge state information being stored in correlation with each other. The processor executes a merge process for storing data in an entry on the basis of a store command to a storage apparatus and updates the entry merge state information associated with a group that includes entries to be merged. The processor preferentially selects, on the basis of the entry merge state information, a group that includes a merge-completed entry in which the data is stored in all blocks, preferentially selects a merge-completed entry from the selected group.

10 Claims, 11 Drawing Sheets

(51) Int. Cl.
   *G06F 12/0804* (2016.01)
   *G06F 9/34* (2018.01)
   *G06F 12/0895* (2016.01)
   *G06F 12/126* (2016.01)
   *G06F 12/0864* (2016.01)
   *G06F 12/0868* (2016.01)
   *G06F 12/0871* (2016.01)
   *G06F 12/04* (2006.01)

(52) U.S. Cl.
   CPC .......... *G06F 3/0659* (2013.01); *G06F 3/0689* (2013.01); *G06F 9/34* (2013.01); *G06F 12/04* (2013.01); *G06F 12/0804* (2013.01); *G06F 12/0864* (2013.01); *G06F 12/0868* (2013.01); *G06F 12/0871* (2013.01); *G06F 12/0895* (2013.01); *G06F 12/126* (2013.01); *G06F 2212/1016* (2013.01)

(58) Field of Classification Search
   USPC ........................................................ 707/808
   See application file for complete search history.

(56) References Cited

U.S. PATENT DOCUMENTS

| | | | |
|---|---|---|---|
| 2013/0242425 A1* | 9/2013 | Zayas | .................... G06F 3/064 360/15 |
| 2016/0217082 A1 | 7/2016 | Osada | |
| 2017/0060422 A1* | 3/2017 | Sharifie | .................. G06F 3/061 |

FOREIGN PATENT DOCUMENTS

| | | |
|---|---|---|
| JP | 2014-052754 A | 3/2014 |
| WO | 2015/033551 A1 | 3/2015 |

OTHER PUBLICATIONS

International Search Report for PCT Application No. PCT/JP2016/086736, dated Mar. 7, 2017.

English translation of Written opinion for PCT Application No. PCT/JP2016/086736.

* cited by examiner

STORE MERGE APPARATUS, STORE CONTROL METHOD, AND RECORDING MEDIUM FOR RECORDING COMPUTER PROGRAM

This application is a National Stage Entry of PCT/JP2016/086736 filed on Dec. 9, 2016, which claims priority from Japanese Patent Application 2015-243209 filed on Dec. 14, 2015, the contents of all of which are incorporated herein by reference, in their entirety.

TECHNICAL FIELD

The present invention relates to a store merge processing system using an information processing apparatus (computer).

BACKGROUND ART

As a method for suppressing an access frequency to a storage apparatus, there is a method called a store merge method. Generally, in a store merge method, a store merge apparatus merges a plurality of store commands (writing commands) for the same area of a storage apparatus into one and then writes data to the storage apparatus, thereby reducing a frequency of access to the storage apparatus. In the following, the processing of merging a plurality of store commands into one is referred to as "merge processing". A buffer for temporarily storing data to be written in a storage apparatus by a store merge apparatus is referred to as a "store buffer".

PTL 1 discloses a technique relating to output (ejection) control of data from a store buffer to a storage apparatus, for example. A store merge apparatus disclosed in PTL 1 performs data output from a store buffer by using a lapse of a predetermined time from the first store command, or a decrease in a number of pieces of data stored in a write buffer, waiting to be written from the store merge apparatus to a storage apparatus as a trigger.

PTL 2 discloses a store control apparatus which simplifies control of data ejection from a store buffer. The store control apparatus disclosed in PTL 2 stores data in a store buffer unit including a plurality of Ways which store data in unit of line including a plurality of blocks. Then, the store control apparatus ejects data while prioritizing a Way in which all blocks in a line exist within the store buffer unit.

CITATION LIST

Patent Literature

[PTL 1] Japanese Laid-open Patent Publication No. 2012-043202
[PTL 2] Japanese Laid-open Patent Publication No. 2014-052754

SUMMARY OF INVENTION

Technical Problem

However, in the store merge apparatus described in PTL 1, data in which merging of data is not actively performed (a merge rate is low) may be selected as data to be ejected from the store buffer. A low merge rate means that a mergeable store command may be issued immediately after. Specifically, this store merge apparatus has a problem that an effect of reducing access to a storage apparatus is low.

In the store control apparatus described in PTL 2, there is a problem that efficiency in selection of data to be ejected from the store buffer may be low. In this store control apparatus, when a store request is received, in a case where there is no vacancy (entry is full) in a group of entries which is indicated in an address array by a middle address (index) of a request, ejection of an entry is performed. Specifically, it may be said that this store control apparatus is based on a premise that a range of entries serving as a target for selection processing is designated by address information included in a request. However, there is a case that, as a trigger for ejection from a store buffer, a cause of ejection and a specific entry in a store buffer are not associated with, as in a case where a resource of a route through which writing to a storage apparatus is performed is vacant, for example. In this case, information relating to a range for ejection is not present, and the range for ejection is not designated. Therefore, in the store control apparatus described in PTL 2, there is a problem that selection processing takes time, since all entries in the store buffer are searched one by one as selection candidates.

One object of the present invention is to provide a store merge apparatus and the like capable of controlling a store buffer with high efficiency in an ejecting operation in which a range for ejection in a store buffer is not designated.

Solution to Problem

In order to achieve the aforementioned object, a store merge apparatus according to an aspect of the present invention has the following configuration.

That is, a store merge apparatus according to an aspect of the present invention includes, storage means for storing a plurality of entries including a plurality of blocks capable of storing block data, and entry merge state information indicating, for each group into which the plurality of entries are divided, a state of merge in the plurality of entries included in the group, in association with each other;

merge means for executing, based on a store command being received from an external apparatus and instructing writing of data to a storage apparatus, merge processing of storing the data in the entry of the storage means, and updating the entry merge state information associated with a group including an entry serving as a target of the merge processing; and output means for preferentially selecting a group including a merge-completed entry in which the data are stored in all blocks, based on the entry merge state information, further preferentially selecting a merge-completed entry from the selected group, and outputting a selected entry to the storage apparatus.

In addition, in order to achieve the same object aforementioned, an information processing apparatus according to an aspect of the present invention includes, a store merge apparatus including aforementioned constitution and a central processing apparatus for issuing a store command instructing writing of data to the store merge apparatus; and a storage apparatus for storing an entry output from the store merge apparatus.

Further, in order to achieve the same object aforementioned, a store control method according to an aspect of the present invention by an information processing apparatus includes, receiving a store command instructing writing of data to a storage apparatus;

executing merge processing of storing the data in an entry, based on the store command, with respect to storage means for storing a plurality of entries including a plurality of blocks capable of storing block data, and entry merge state information indicating, for each group into which the plurality of entries are divided, a state of merge in the plurality of entries included in the group, in association with each other;

updating the entry merge state information associated with a group including an entry serving as a target of the merge processing;

preferentially selecting a group including a merge-completed entry in which the data are stored in all blocks, based on the entry merge state information;

further preferentially selecting a merge-completed entry from the selected group; and outputting a selected entry to the storage apparatus.

Further, the aforementioned object is also achieved by a computer program causing a computer to implement each of a store merge apparatus and an information processing apparatus having the aforementioned respective configurations and methods associated with the store merge apparatus and the information processing apparatus, and a computer-readable storage medium storing the computer program.

Advantageous Effects of Invention

The present invention is advantageous in that it is possible to perform efficient control of a store buffer.

DESCRIPTION OF EMBODIMENTS

Next, example embodiments of the present invention are described in detail with reference to the drawings.

First Example Embodiment

Figure 1:
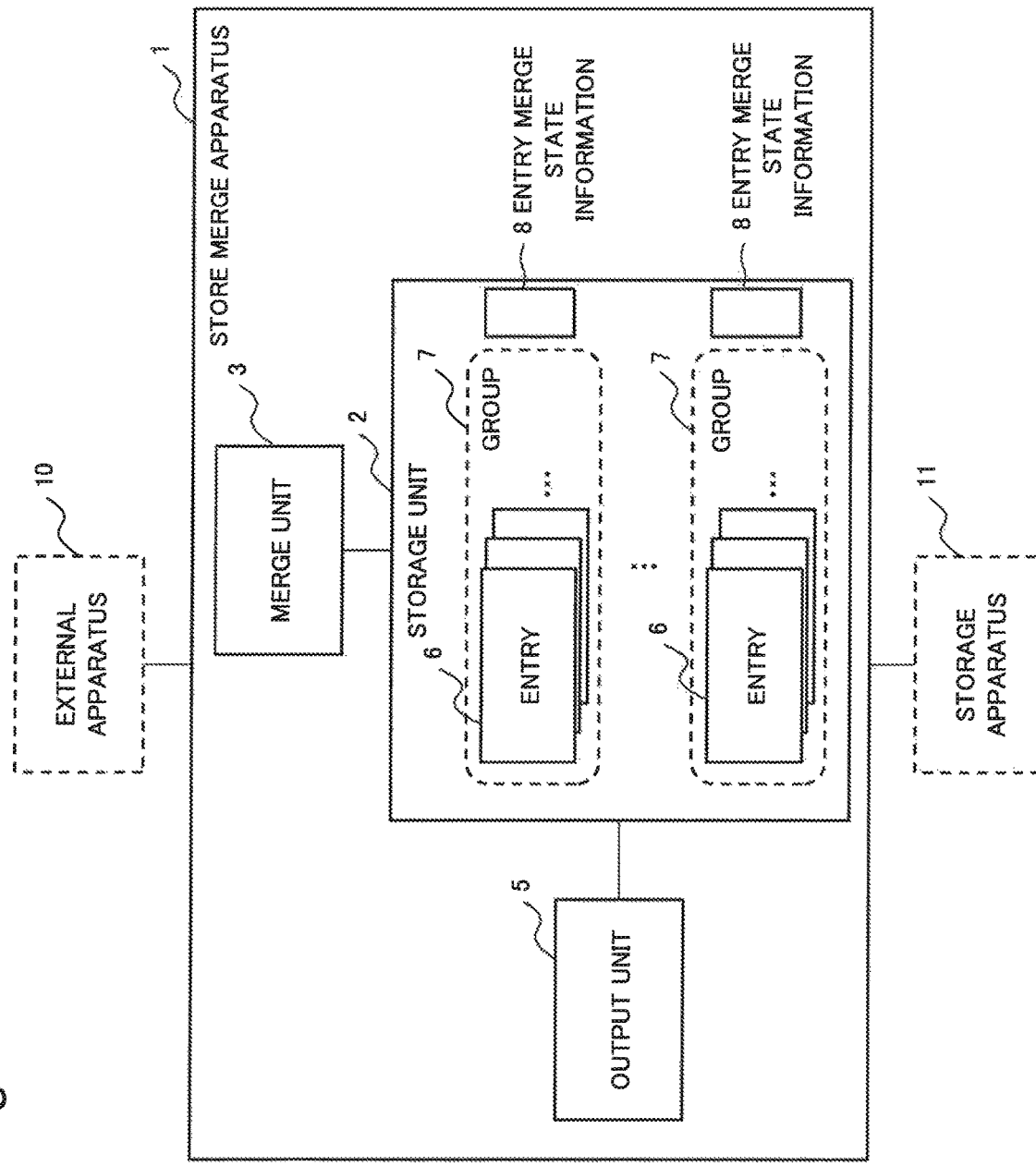
FIG. 1 is a block diagram illustrating a configuration of a store merge system according to a first example embodiment of the present invention.

FIG. 1 is a block diagram illustrating a configuration of a store merge system according to a first example embodiment of the present invention. Referring to FIG. 1, the store merge system according to the present example embodiment includes a store merge apparatus 1, an external apparatus 10, and a storage apparatus 11.

The store merge apparatus 1 is connected to the external apparatus 10 and the storage apparatus 11 via a bus, a communication network, or the like.

The store merge system illustrated in FIG. 1 may be configured by a general information processing apparatus (computer) which is operated by control of a computer program (software program) executed by using a central processing unit (CPU: not illustrated). Alternatively, respective units of the store merge system may be constituted by a dedicated hardware device or a logic circuit. A hardware configuration example in which the store merge system is implemented by a computer will be described later with reference to FIG. 11.

The external apparatus 10 issues, to the store merge apparatus 1, a store command instructing writing of data to the storage apparatus 11. The storage apparatus 11 is able to store received data via the store merge apparatus 1.

The store merge apparatus 1 includes a storage unit 2, a merge unit 3, and an output unit 5.

The storage unit 2 is able to store a plurality of entries 6 including a plurality of blocks capable of storing block data. The storage unit 2 is able to store, for each group 7 into which the plurality of entries 6 are divided, entry merge state information 8 indicating a state of merge in the plurality of entries 6 included in the group 7 in association with each group 7. The entry merge state information 8 is updated (generated) by the merge unit 3. The storage unit 2 corresponds to a "store buffer" in the aforementioned general store merge method described in the section "Background Art". The storage unit 2 is implemented by a semiconductor memory apparatus or the like, for example.

The merge unit 3 is able to receive, from the external apparatus 10, a store command instructing writing of data to the storage apparatus 11. The merge unit 3 stores the data in one of the entries 6 in the storage unit 2, based on the store command. In the following, this operation of the merge unit 3 is referred to as "merge processing". For example, in merge processing, data including a plurality of consecutive block data are divided into block units and stored in a plurality of consecutive blocks in one of the entries 6. A plurality of store commands for the same area of the storage apparatus 11 are processed as block data overwriting for the same block in the same entry 6. In the following, for example, a block in which block data are stored is referred to as a "merge-completed block".

The merge unit 3 updates the entry merge state information 8 associated with a group 7 including an entry serving as a target for merge processing.

The output unit 5 preferentially selects a group 7 including a merge-completed entry in which data are stored in all blocks, based on the entry merge state information 8 when output to the storage apparatus 11 is performed. The output unit 5 preferentially selects the merge-completed entry from the selected group 7, and outputs the selected entry to the storage apparatus 11. When there is no entry 6 in which all blocks are merged, the output unit 5 may select a group 7 including an entry 6 indicating that the number of merge-completed blocks is relatively large, and may output the entry 6 selected from the group 7 to the storage apparatus 11.

In this way, the present example embodiment is advantageous in that it is possible to provide a store merge apparatus and the like which is capable of controlling a store buffer with high efficiency, even when an ejecting operation without designating a range for output (ejection) is performed in the storage unit 2 (store buffer).

A reason for this is that the output unit 5 preferentially selects a group 7 including a merge-completed entry 6 from the entirety of the storage unit 2, based on the entry merge state information 8. Another reason is that the output unit 5 preferentially selects the merge-completed entry 6 from the selected group 7 as an output target. Specifically, since the output unit 5 is able to narrow down a selection range of an entry 6 serving as an output target, by the entry merge state information 8 for each group 7, there is an advantage that efficiency is high even when ejection without designating a range for ejection is performed.

The present example embodiment is also advantageous in that it is possible to provide a store merge apparatus and the like, which is capable of reducing a number of times of outputting to the storage apparatus 11.

A reason for this is that the merge unit 3 is able to temporarily accumulate data in the storage unit 2, and merges a plurality of store commands with respect to the storage unit 2. Another reason is that the output unit 5 is able to output the entry 6 being data that reflect a store command to the storage apparatus 11, at a timing which is determined independently of issuance of a store command.

The present example embodiment is not limited for the aforementioned respective units or unillustrated functional units in the store merge apparatus 1 to also perform processing of inputting/outputting a command other than a store command, and output processing from the storage unit 2 at a timing other than the aforementioned timing and in a range other than the aforementioned output range.

Second Example Embodiment

Next, a second example embodiment based on the aforementioned first example embodiment is described. In the following, features according to the second example embodiment are mainly described. Constituent elements of the second example embodiment having a similar configuration to the first example embodiment are indicated with same reference numerals as the reference numerals provided in the first example embodiment, and overlapped detailed description on the constituent elements is omitted.

Figure 2:
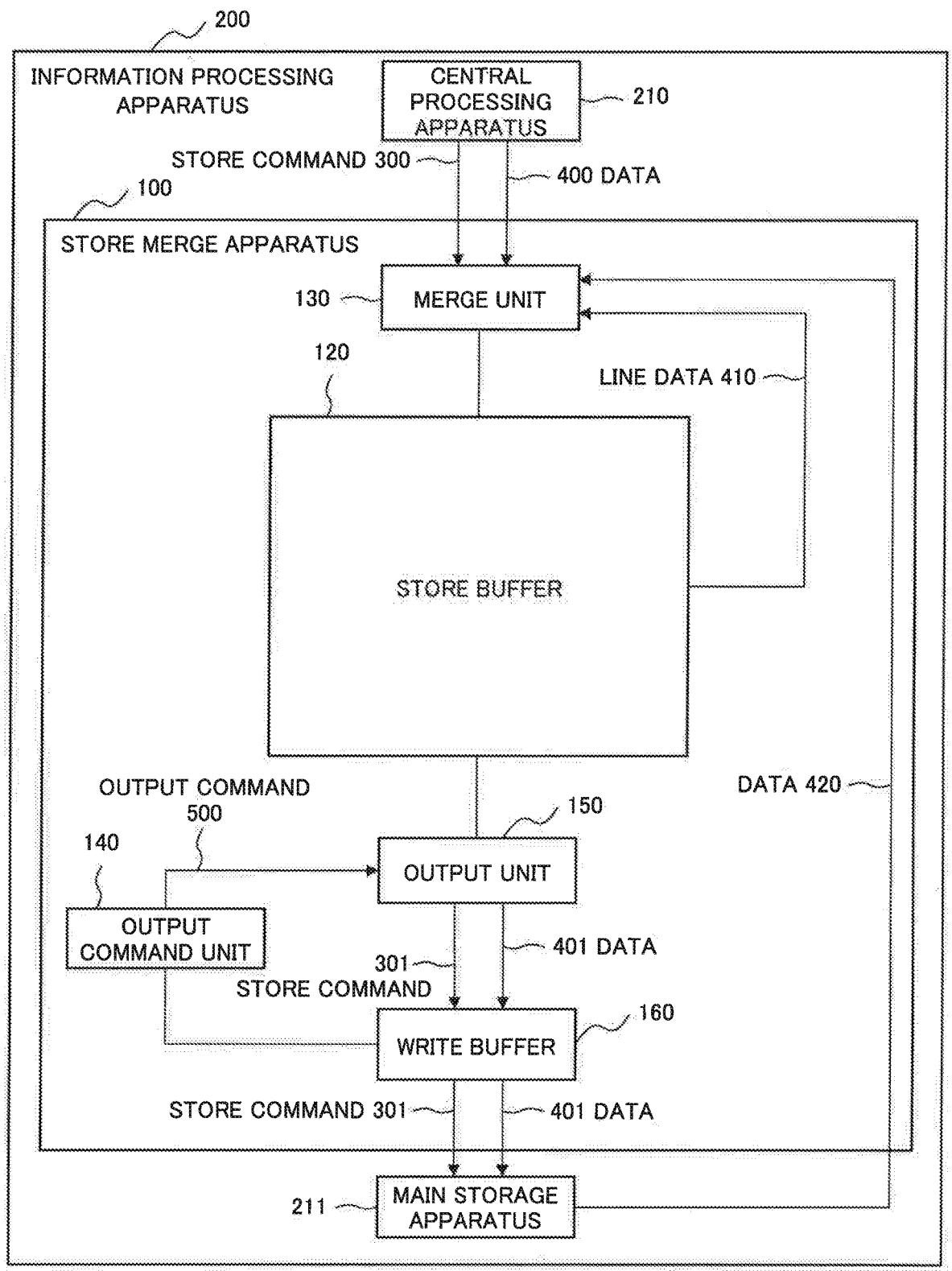
FIG. 2 is a block diagram illustrating a configuration of an information processing apparatus 200 in a second and a third example embodiments of the present invention.

In the following, a configuration of the present example embodiment is described with reference to FIG. 2. FIG. 2 is a block diagram illustrating a configuration of an information processing apparatus 200 in the second and third example embodiment of the present invention. Referring to FIG. 2, the information processing apparatus 200 in the present example embodiment includes a central processing apparatus 210, a store merge apparatus 100, and a main storage apparatus 211. A direction of an arrow in the drawing indicates an example, and does not limit a direction of a signal between blocks or a direction of information transmission.

The store merge apparatus 100 is connected to the central processing apparatus 210 and the main storage apparatus 211 via a communication network such as a bus.

The information processing apparatus 200 may be constituted by a general information processing apparatus (computer) which is operated by control of a computer program (software program) executed by using the central processing apparatus (CPU) 210. Alternatively, respective units of the information processing apparatus 200 may be constituted by a dedicated hardware device or a logic circuit. A hardware configuration example in which the information processing apparatus 200 is implemented by a computer will be described later with reference to FIG. 11.

The central processing apparatus 210 issues, to the store merge apparatus 100, a store command 300 instructing writing of data 400 to the main storage apparatus 211. The central processing apparatus 210 corresponds to the external apparatus 10 in the first example embodiment. In the present example embodiment, the central processing apparatus 210 outputs, as an example of a "block" in the first example embodiment, the data 400 by using 8 bytes as a block unit. In the following, "byte" is described as "B". For example, "8 bytes" is described as "8B".

Figure 4:
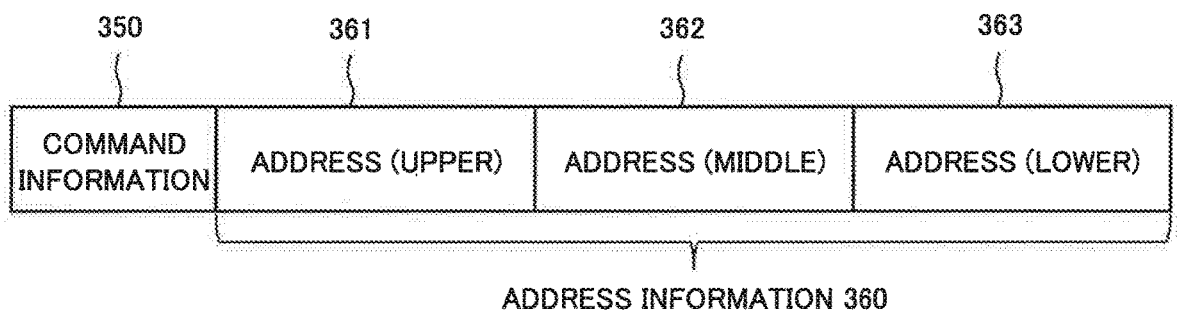
FIG. 4 is a diagram illustrating an example of a configuration of store commands 300 and 301 in the second example embodiment.

FIG. 4 is a diagram illustrating an example of a configuration of the store command 300 and a store command 301 in the second example embodiment. Referring to FIG. 4, the store command 300 includes address information 360 and command information 350. In the present example embodiment, the command information 350 includes identifier information of a command, indicating a store command. The address information 360 is address information indicating a writing destination of the data 400, in the main storage apparatus 211. In the present example embodiment, the address information 360 is divided into three pieces of information i.e. an address (upper) 361, an address (middle) 362, and an address (lower) 363. Details on the address (upper) 361, the address (middle) 362, and the address (lower) 363 will be described later in a description of a store buffer 120.

The main storage apparatus 211 holds data 401 in accordance with the store command 301 to be output from the store merge apparatus 100. The main storage apparatus 211 corresponds to the storage apparatus 11 in the first example embodiment. The main storage apparatus 211 is implemented by a semiconductor memory apparatus or the like, for example. In the present example embodiment, the main storage apparatus 211 performs data reading and writing by using 128 B as a unit block. Specifically, the store merge apparatus 100 outputs the data 401 to the main storage apparatus 211 by a size of 128 B. In the following, a unit area in the main storage apparatus 211 for writing is referred to as a "line".

The store merge apparatus 100 includes a store buffer 120, a merge unit 130, an output command unit 140, an output unit 150, and a write buffer 160. In the present example embodiment, the store merge apparatus 100 temporarily accumulates, in the write buffer 160, the store command 301 and the data 401 to be output to the main storage apparatus 211. The write buffer 160 successively outputs the store command 301 and the data 401 at a predetermined period depending on an operation of the main storage apparatus 211. Therefore, it may also be said that the write buffer 160 is a part of an output path for adjusting a writing load on the main storage apparatus 211. An operation of outputting (ejecting) data from the output unit 5 to the storage apparatus 11 in the first example embodiment corresponds to an operation of outputting (ejecting) from the output unit 150 to the write buffer 160 in the present example embodiment.

Figure 3:
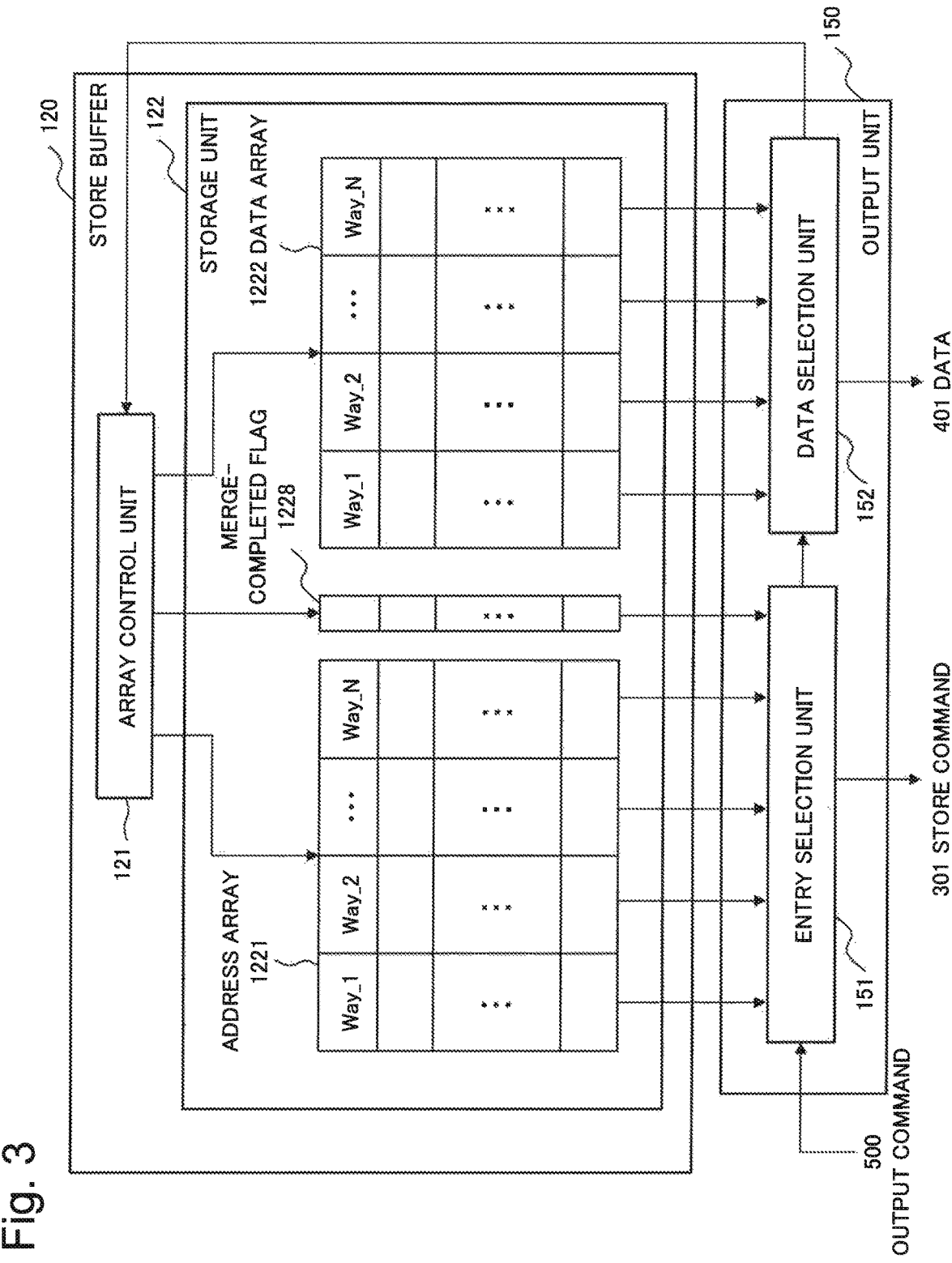
FIG. 3 is a block diagram illustrating a detailed configuration of a store buffer 120 and an output unit 150 in the second example embodiment.

Next, a detailed configuration of the store buffer 120 is described. FIG. 3 is a block diagram illustrating a detailed configuration of the store buffer 120 and the output unit 150 in the second example embodiment. Referring to FIG. 3, the store buffer 120 includes an array control unit 121 and a storage unit 122. The storage unit 122 includes an address array 1221, a data array 1222, and a merge-completed flag (merge-completed information) 1228. The storage unit 122 is based on the storage unit 2 in the first example embodiment. A direction of an arrow in the drawing indicates an example, and does not limit a direction of signal between blocks or a direction of information transmission.

In the present example embodiment, as illustrated in FIG. 3, as an example of a store buffer method, an N-way set associative method in which entries 6 of N columns (ways) are managed as one group (set) 7 each is used. "N" indicates an integer of 2 or more. As illustrated in FIG. 3, the address array 1221 and the data array 1222 are divided into areas each having a same number of rows, wherein the same N ways of entries 6 are included in each row. Entries having the same way number and the same row number in the address array 1221 and the data array 1222 have a one-to-one correspondence. A "row" in each of the address array 1221 and the data array 1222 corresponds to a group 7.

Figure 5:
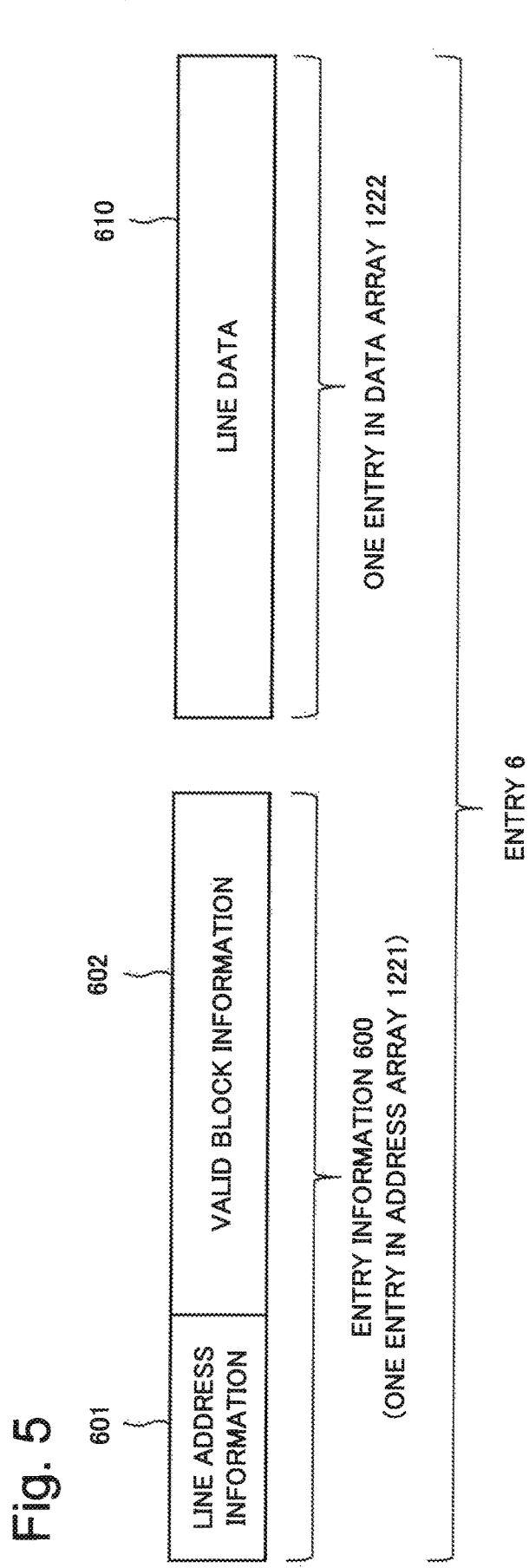
FIG. 5 is a diagram illustrating a configuration example of an entry 6 in the second example embodiment.

In the present example embodiment, the storage unit 122 manages the entries 6 by using a line being an area, which is acquired by dividing a storage area of the main storage apparatus 211 into 128 B each, as a unit. The line is a unit for data writing in the main storage apparatus 211. As illustrated in FIG. 5, in the present example embodiment, the entry 6 is divided and stored in the data array 1222 including line data 610 being data to be stored in a line, and in the address array 1221 including entry information 600 being information relating to the data. FIG. 5 is a diagram illustrating a configuration example of the entry 6 in the second example embodiment.

The data array 1222 is able to store, as the line data 610 being data of a line unit (128 B), data 400 of a block unit (8 B) for which writing to the main storage apparatus 211 is instructed by the store command 300. Specifically, in the present example embodiment, one line data 610 include sixteen blocks. The address (lower) 363 being a lower address portion of the address information 360 of the store command 300 corresponds to a position (offset) from a leading position of the line data 610. Specifically, the data 400 are stored in a block at a position indicated by the address (lower) 363, in the line data 610. The data 400 are stored in the line data 610 as a result of merge processing of the merge unit 130. Specifically, it may be said that a block in which the data 400 are stored is a merge-completed block.

The address array 1221 is able to store a plurality of pieces of the entry information 600. Referring to FIG. 5, each piece of the entry information 600 includes line address information 601 and valid block information 602.

The line address information 601 is address information indicating a line (writing destination line) including a block indicated by the address information 360 of the store command 300. Specifically, the line address information 601 stores the address (upper) 361 being an upper address portion of the address information 360. Each row in the address array 1221 is associated with the address (middle) 362 being a middle address portion of the address information 360. Specifically, an address acquired by combining the address (upper) 361 being the line address information 601 and the address (middle) 362 associated with a row in the address array 1221 indicates a leading position of a writing destination, to which a line in the main storage apparatus 211 is written.

Figure 6:
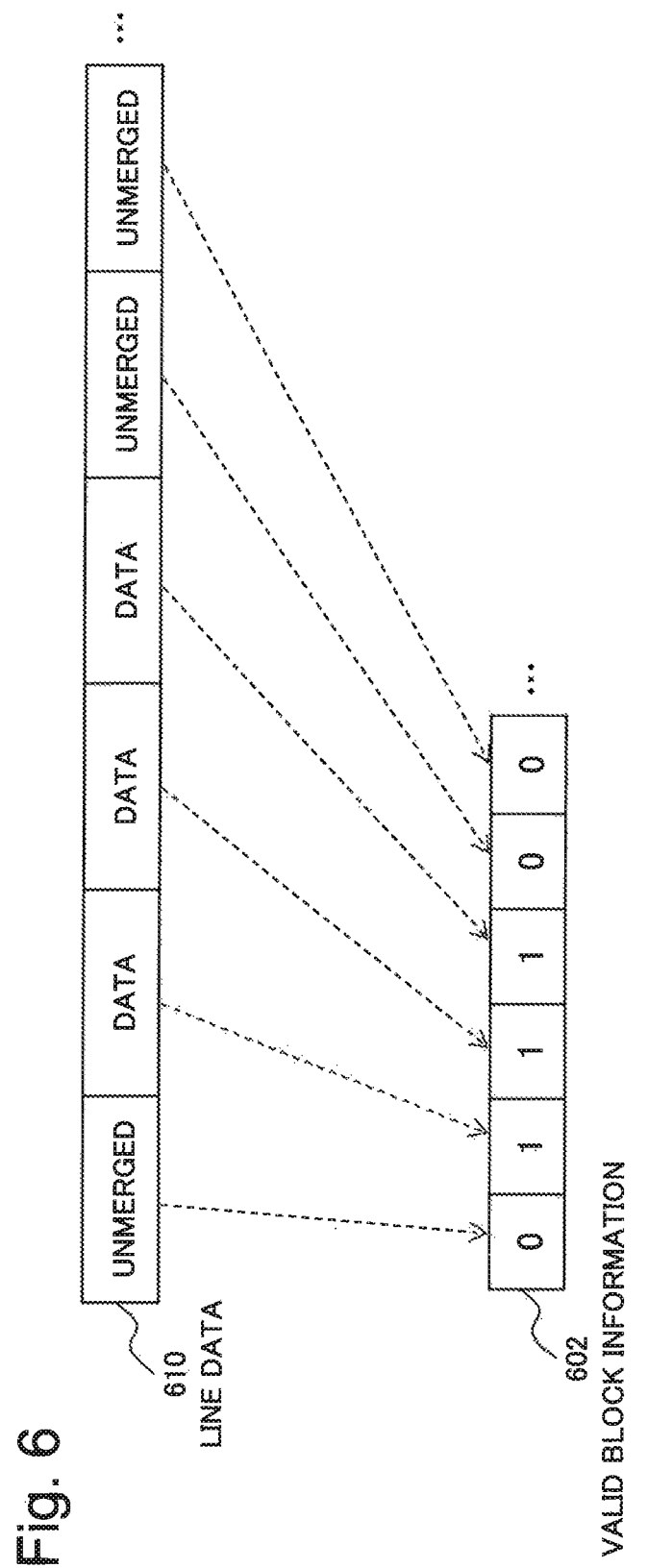
FIG. 6 is a diagram illustrating an example of a relationship between valid block information 602 and line data 610 in the second example embodiment.

The valid block information 602 is information indicating a position of a merge-completed block in the line data 610 to be stored in the associated data array 1222. The valid block information 602 is able to store the same number of pieces of information as blocks included in the line data 610. In the present example embodiment, the valid block information 602 includes information of 16 bits in total, when it is assumed that one bit is allocated per block. FIG. 6 is a diagram illustrating an example of a relationship between the valid block information 602 and the line data 610 in the second example embodiment. As illustrated in FIG. 6, each bit of the valid block information 602 is such that a block in which data are stored is indicated as "1". Each bit of the valid block information 602 is such that an unmerged block in which data are not stored (overwritten) yet by a store command is indicated as "0".

Each column in the address array 1221 is able to indicate that an entry 6 is unused (invalid). For example, when a value identifiable as an address value such as a minus integer value is set in the line address information 601, the entry 6 may be represented to be unused. Alternatively, when all pieces of the valid block information 602 are "0", the entry 6 may be represented to be unused.

The merge-completed flag (merge-completed information) 1228 being another piece of information included in the storage unit 122 is described. The merge-completed flag 1228 is based on the entry merge state information 8 in the first example embodiment. In the present example embodiment, when the merge-completed flag 1228 is "1", this means that a merge-completed entry in which all blocks of the line data 610 are merged is included in a row in the data array 1222 associated with the merge-completed flag 1228. It may be said that a merge-completed entry in which all bits of the valid block information 602 are "1" is included in the address array 1221 at a row where the merge-completed flag 1228 is "1". In the present example embodiment, as a specific example, the merge-completed flag 1228 is a register of 1 bit, which is associated with each row in the address array 1221. The merge-completed flag 1228 may be a storage apparatus other than the address array 1221 and the data array 1222.

The array control unit 121 performs reading and writing with respect to the address array 1221 and the data array 1222 in accordance with control of the merge unit 130 and the output unit 150.

The foregoing is a detailed configuration of the store buffer 120. Next, configuration of the store merge apparatus 100 other than the above is described.

The merge unit 130 is based on the merge unit 3 in the first example embodiment. The merge unit 130 receives the store command 300 and the data 400 from the central processing apparatus 210. The merge unit 130 stores information on the store command 300 and the data 400, in one of the entries 6 of the storage unit 122 via the array control unit 121. In the present example embodiment, the merge unit 130 stores a plurality of store commands 300 for the same line in the same entry 6 of the storage unit 122 by merge processing. Specifically, when the merge unit 130 receives the store command 300 which targets an entry 6, which is already stored in the storage unit 122, the merge unit 130 overwrites a block associated with the data 400, on the line data 610 read from the data array 1222 in the entry 6. The merge unit 130 updates the valid block information 602 read from the address array 1221 in the entry 6.

In the present example embodiment, when an entry 6 as a target of merge processing becomes a merge-completed entry, the merge unit 130 updates the merge-completed flag 1228 associated with a row in the address array 1221 including the entry 6 to "1".

In the present example embodiment, as an example of an output timing with no designation on the selection range of the entry 6 to be output, when a vacant capacity of the write buffer 160 becomes equal to or smaller than a threshold value, the output command unit 140 transmits an output command 500 to the output unit 150. It may also be said that, when the write buffer 160, which is an output path to the main memory 211, is empty, the output instructing unit 140 instructs the output unit 150 to select any appropriate entry 6 and to output (eject) the selected entry 6.

The output unit 150 is based on the output unit 5 in the first example embodiment. Referring to FIG. 3, the output unit 150 in the present example embodiment includes an entry selection unit 151 and a data selection unit 152.

Upon receiving an output command 500, the entry selection unit 151 preferentially selects a row (group 7) in the address array 1221 including an entry 6 which stores the data 400 in all the blocks (merge-completed), based on the merge-completed flag 1228. The entry selection unit 151 preferentially selects the merge-completed entry 6, based on the valid block information 602 of each entry 6 included in the selected row in the address array 1221. The entry selection unit 151 outputs, to the write buffer 160, the store command 301 generated on the basis of information on the selected entry 6 in the address array 1221.

The data selection unit 152 outputs, to the write buffer 160, the line data 610 stored in the data array 12212 in the entry 6 selected by the entry selection unit 151, as the data 401.

As described above, a structure and a content of each of the merge unit 130, the storage unit 122, the output command unit 140, and the output unit 150 in the present example embodiment are similar to the first example embodiment except for the aforementioned points, and therefore, overlapped detailed description thereof is omitted.

Next, an operation of the present example embodiment having the aforementioned configuration is described in detail. As the operation in the present example embodiment, there are two operations i.e. a merge operation to be performed when the store command 300 is issued from the central processing apparatus 210, and an ejecting operation to be performed when the output command 500 is issued from the output command unit 140.

Figure 7:
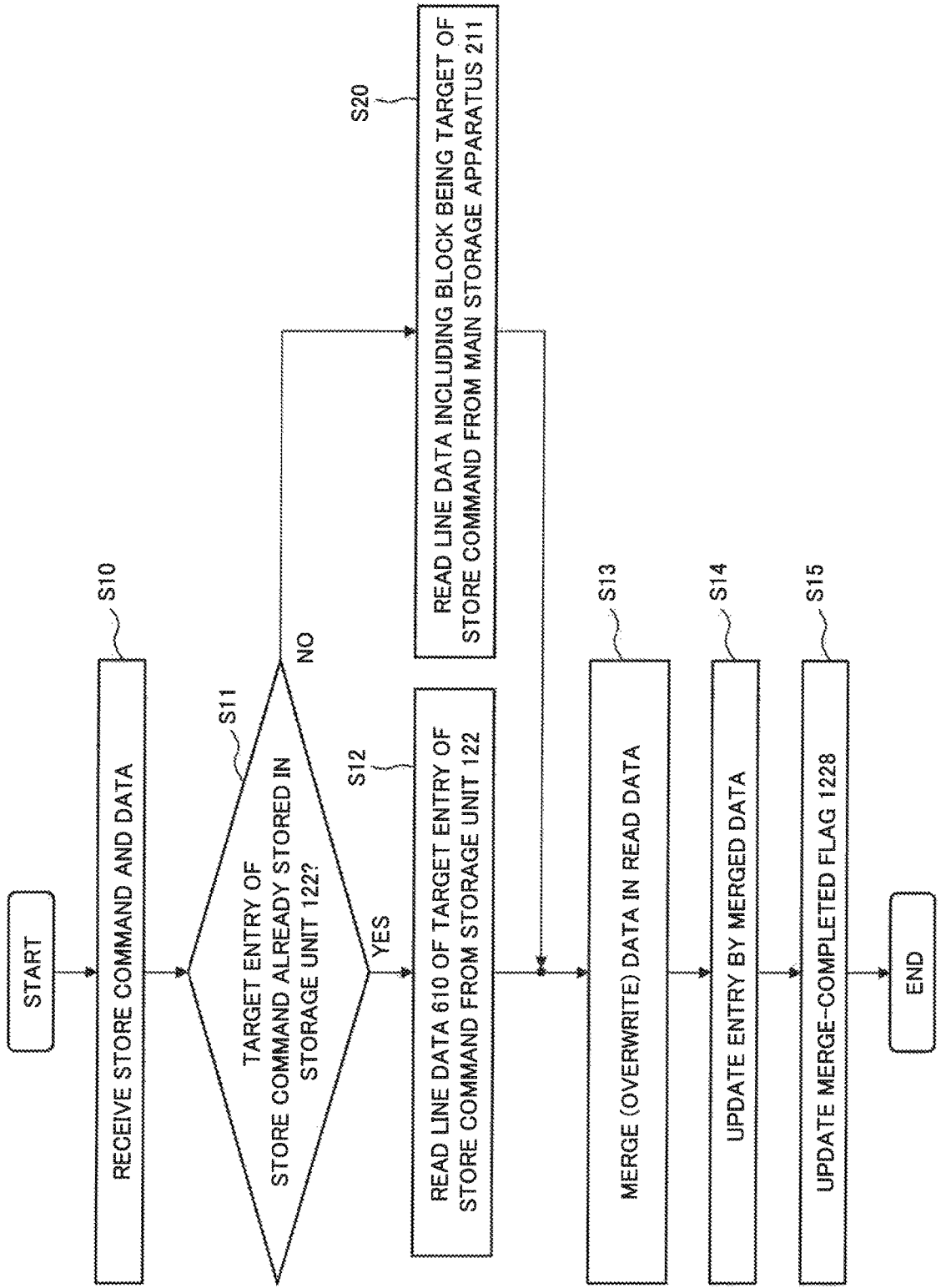
FIG. 7 is a flowchart illustrating a merge operation of a store merge apparatus 100 in the second example embodiment.

First of all, a merge operation is described with reference to FIG. 7. FIG. 7 is a flowchart illustrating a merge operation of the store merge apparatus 100 in the second example embodiment. In the following, a flow of information is described with reference to FIG. 2. A configuration of each store command is described with reference to FIG. 4.

The central processing apparatus 210 issues, to the store merge apparatus 100, the store command 300 instructing writing of the data 400 to the main storage apparatus 211. As described above, the data 400 includes data of one block (8 B). The command information 350 of the store command 300 includes an identifier indicating "writing". The address information 360 of the store command 300 includes address information indicating a writing destination of the data 400 (block) in the main storage apparatus 211.

In the store merge apparatus 100, the merge unit 130 receives the store command 300 and the data 400 (Step S10).

The merge unit 130 checks via the array control unit 121 whether or not an entry 6 as a target of the store command 300 is stored in the storage unit 122 (Step S11). A configuration of the entry 6 is described with reference to FIG. 5. Specifically, the merge unit 130 searches whether or not an entry 6, in which the same information as the address (upper) 361 of the store command 300 is stored in the line address information 601, is present in a row associated with the address (middle) 362 of the store command 300 in the address array 1221.

When an entry 6 as a target of the store command 300 is already stored in the storage unit 122 (YES in Step S11), the merge unit 130 reads the line data 610 of the entry 6 from the storage unit 122 via the array control unit 121 (Step S12). As a specific example, a case in which an entry 6 as a target of the store command 300 is found in Way_3 having a row number 2 in the address array 1221 is described. In this case, the array control unit 121 reads the line data 610 of 128 B, which is stored in Way_3 having a row number 2 in the data array 1222, and outputs the data to the merge unit 130.

On the other hand, when an entry 6 as a target of the store command 300 is not yet stored in the storage unit 122 (NO in Step S11), the merge unit 130 reads, from the main storage apparatus 211, data of a line including a block being a target of the store command 300 (Step S20). Specifically, the merge unit 130 reads, from the main storage apparatus 211, line data 410 of 128 B, which are stored in a line to be specified by the address (upper) 361 and the address (middle) 362 of the store command 300.

Following Step S12 or Step S20, the merge unit 130 merges (overwrites) the data 400 with the read data (Step S13). Specifically, the merge unit 130 overwrites the data 400 to the line data 610 read from the storage unit 122, or at a position (block) indicated by the address (lower) 362 of the store command 300 in data read from the main storage apparatus 211.

Next, the merge unit 130 updates the entry 6 by the merged data via the array control unit 121 (Step S14). Specifically, when the line data 610 has been read in Step S12, the merge unit 130 stores overwritten data in the line data 610 of the data array 1222 in the same entry 6. The merge unit 130 updates a bit associated with a block in which the data 400 are stored to "1" with respect to the valid block information 602 of the address array 1221 in the entry 6.

On the other hand, when data are read from the main storage apparatus 211 in Step S20, the merge unit 130 secures a new entry 6 in a vacant area of a row associated with the address (middle) 362 of the store command 300. In the new entry 6, address information of the address (upper) 361 of the store command 300 is stored in the line address information 601 of the address array 1221. All bits of the valid block information 602 are initialized to "0". Thereafter, with respect to the new entry 6, the merge unit 130 stores data in the line data 610 and updates the valid block information 602, in a similar manner when the line data 610 are read in Step S12.

Lastly, the merge unit 130 updates the merge-completed flag 1228 via the array control unit 121 (Step S15). The merge unit 130 updates the merge-completed flag 1228 associated with the entry 6 in which the data 400 are stored in all blocks to "1" via the array control unit 121. Specifically, when all bits of the valid block information 602 updated in Step S14 are "1", the merge unit 130 sets "1" indicating a merge-completed entry in the merge-completed flag 1228 associated with the entry 6. Otherwise, the merge unit 130 sets "0" indicating an entry which has not been merged, in the merge-completed flag 1228 associated with the entry 6.

The foregoing is a merge operation to be performed when the store command 300 is issued from the central processing apparatus 210. For example, when sequential data of 24B are written, the central processing apparatus 210 issues three store commands 300 in total, for respective blocks acquired by dividing the data by 8B each into three. The store merge apparatus 100 is able to generate one line data 610 that reflect three store commands 300, as illustrated in FIG. 6, by repeating the aforementioned merge operation three times in association with the three store commands 300.

In the aforementioned merge operation, an operation to be performed by the merge unit 130 via the array control unit 121 may be actively performed by the array control unit 121 without being controlled by the merge unit 130.

Figure 9:
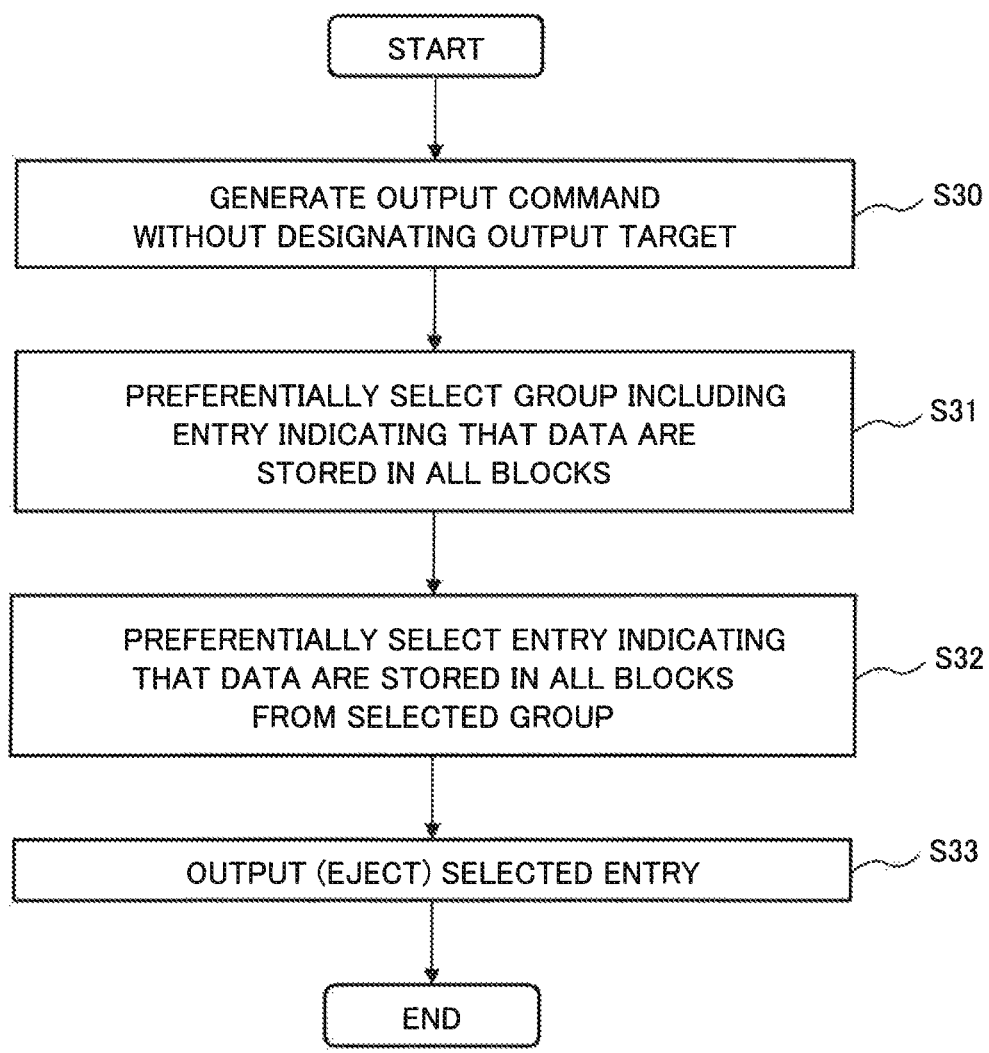
FIG. 9 is a flowchart illustrating an operation of ejection processing of the store merge apparatus 100 in the second example embodiment.

Next, an ejecting operation to be performed when the output command 500 is issued from the output command unit 140 is described with reference to FIG. 9. FIG. 9 is a flowchart illustrating an operation of ejection processing of the store merge apparatus 100 in the second example embodiment. In the following, a flow of information is described with reference to FIG. 2. A configuration of the store buffer 120 and the output unit 150 is described with reference to FIG. 3.

Figure 8:
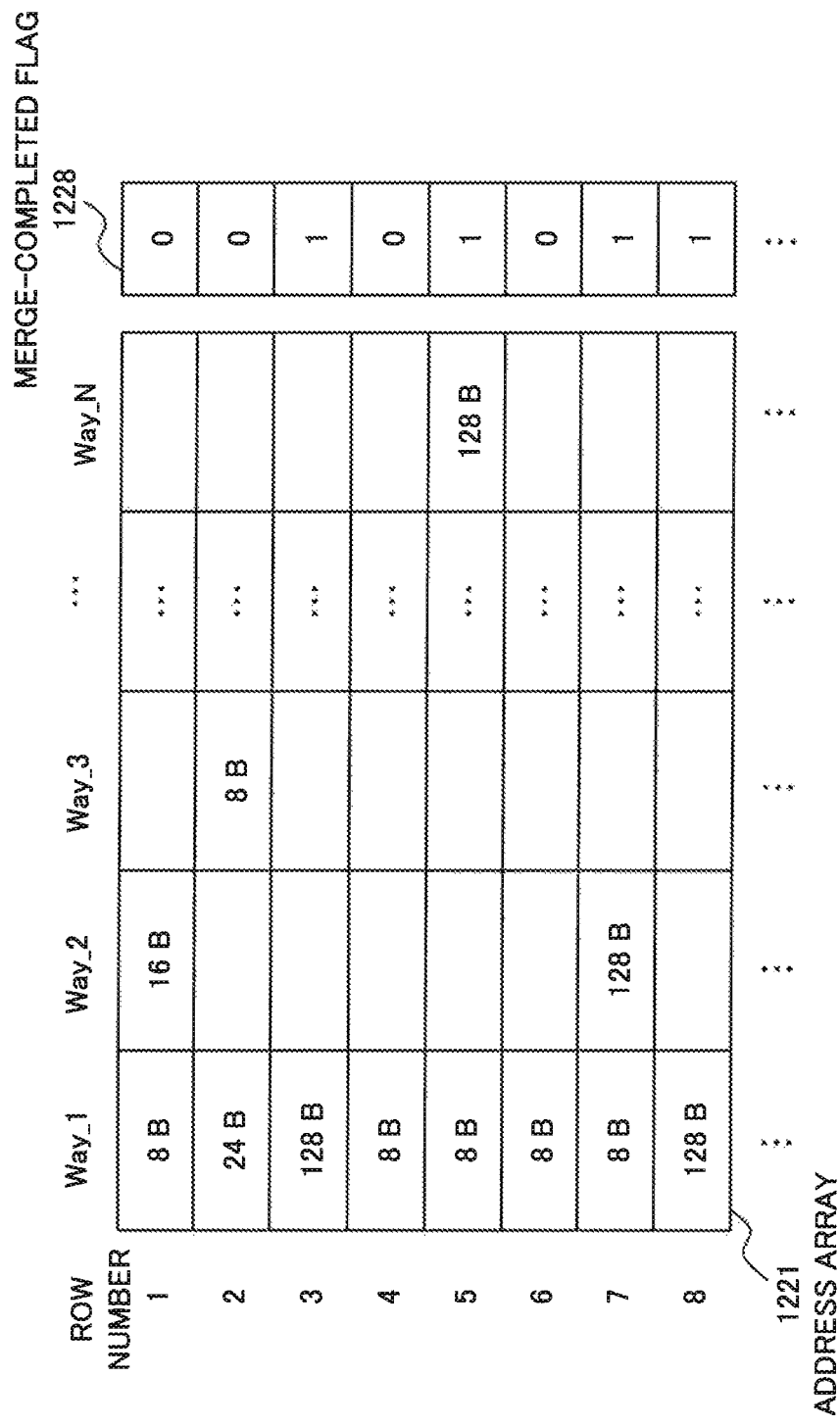
FIG. 8 is a diagram illustrating an example of an address array 1221 and a merge-completed flag 1228 in the second example embodiment.

At the beginning of the following description, it is assumed that the address array 1221 and the merge-completed flag 1228 are in a state illustrated in FIG. 8. FIG. 8 is a diagram illustrating an example of the address array 1221 and the merge-completed flag 1228 in the second example embodiment. In FIG. 8, a character string described in each column of the address array 1221 indicates a size of marge-completed data, which is acquired from a position of a merge-completed block to be stored in the valid block information 602. In FIG. 8, an entry 6 where the address array 1221 is vacant represents an unused entry in which line data 610 are not stored. On the other hand, an entry 6 in a column where a character string is described in the address array 1221 in FIG. 8 is a valid entry.

First of all, in the output command unit 140, an output command 500 without designating an output target is generated (Step S30). In the present example embodiment, as an example of a case where output is required without designating an output target, the output command unit 140 transmits the output command 500 to the output unit 150, when a vacant capacity of the write buffer 160 becomes equal to or smaller than a threshold value. Specifically, the output command unit 140 periodically monitors a state of vacant capacity of the write buffer 160.

In the output unit 150, the entry selection unit 151 receives the output command 500. The entry selection unit 151 preferentially selects a group (row) including an entry 6 in which the data 400 are stored in all blocks, via the array control unit 121 (Step S31). Specifically, the entry selection unit 151 selects an entry of a row where the merge-completed flag 1228 is "1". For example, in FIG. 8, the entry selection unit 151 may select any one of rows having row number 3, 5, 7, and 8. When a row where the merge-completed flag 1228 is "1" is not present, the entry selection unit 151 may select a row including a valid entry 6 by a predetermined group selecting method. For example, the entry selection unit 151 may search a row including a valid entry 6 in ascending order of a row number.

Next, the entry selection unit 151 preferentially selects an entry 6 in which the data 400 are stored in all blocks, from the selected group (Step S32). Specifically, the entry selection unit 151 selects an entry 6 in which every piece of the valid block information 602 of each entry 6 included in a selected row in the address array 1221 is "1". For example, in FIG. 8, when the seventh row is selected, the entry selection unit 151 selects the entry 6 in "Way_2" column. When a row where the merge-completed flag 1228 is not "1" has been selected, the entry selection unit 151 may select one of the valid entries 6 by a predetermined entry selecting method. For example, the entry selection unit 151 may search a valid entry 6 from a leading way in a selected row. The entry selection unit 151 notifies the data selection unit 152 of the selected entry 6.

The entry selection unit 151 and the data selection unit 152 output (eject) the selected entry 6 (Step S33). The entry selection unit 151 generates the store command 301, based on information on the selected entry 6 in the address array 1221. The entry selection unit 151 outputs the generated store command 301 to the write buffer 160. The data selection unit 152 reads the line data 610 associated with the selected entry 6 from the data array 1222 via the array control unit 121. The data selection unit 152 outputs the data 401 including the read line data 610 to the write buffer 160.

The address information 360 of the store command 301 includes leading address information of the line data 610 in the main storage apparatus 211. Specifically, the address (upper) 361 includes a content of the line address information 601 of the selected entry 6 in the address array 1221. The address (middle) 362 includes address information associated with a selected row in the address array 1221. The address (lower) includes address information indicating a leading position of a line to be written.

When an entry 6 is output, the output entry 6 is deleted (invalidated) via the array control unit 121. For example, the array control unit 121 may invalidate the output entry 6 by writing a value distinguishable from an address value such as a minus integer value in the line address information 601 in the address array 1221. The array control unit 121 updates the merge-completed flag 1228 in accordance with a result of which the output entry 6 is deleted. For example, when a merge-completed entry is not present in a row from which an entry 6 is output, the array control unit 121 updates the merge-completed flag 1228 to "0".

After being temporarily accumulated, the store command 301 and the data 401 which are output to the write buffer 160 are successively output to the main storage apparatus 211 at a predetermined period by the write buffer 160.

The foregoing is an ejecting operation to be performed when the output command 500 is issued from the output command unit 140.

As described above, the present example embodiment is advantageous in a similar manner to the aforementioned first example embodiment, in that it is possible to provide a store merge apparatus and the like which is capable of controlling the store buffer 120 with high efficiency even when an ejecting operation without designating a range for output (ejection) in the store buffer 120 is performed.

A reason for this is that the entry selection unit 151 is able to narrow down a selection range of entry 6 serving as an output target by the merge-completed flag 1228 of each row (group 7) in the address array 1221. Another reason is that the entry selection unit 151 is only required to check a state of each entry 6 in the narrowed row range.

It may be said that an entry selecting method in the present example embodiment is efficient both in that a time required for selecting an entry is short, and a merge rate of an entry to be ejected is high. For example, in the present example embodiment, a time required for selecting an entry is remarkably reduced, as compared with a method in which all entries in the address array 1221 are checked one by one and a merge-completed entry is selected, and the like.

As a method for reducing time required for selecting an entry, the present example embodiment is superior in terms of merge rate, as compared with, for example, a method in which rows in the address array 1221 are selected one by one from a leading row in order to select an entry 6. In a method in which rows are selected one by one from a leading row, in an example of FIG. 8, the output order continues in order of Way_2 at a first row (a size of merged data is 16 B), Way_1 at a second row (a size of merged data is 24 B), and Way_1 at a third row (a size of merged data is 128 B). Specifically, in this method, an entry having a low merge rate such as entries in which sizes of merged data are 16 B and 24 B may also be output. A possibility that a block belonging to the same line receives the store command 300 after an entry 6 having a low merge rate is ejected is high, as compared with a merge-completed entry.

Therefore, it may be said that ejection of an entry 6 having a low merge rate may lower a throughput of the store merge apparatus 100 to the main storage apparatus 211. On the other hand, the output order by the entry selection unit 151 in the present example embodiment becomes Way_1 at a third row (a size of merged data is 128 B), Way_N at a fifth row (a size of merged data is 128 B), and Way_2 at a seventh row (a size of merged data is 128 B). The entry selection unit 151 in the present example embodiment is also advantageous in that it is possible to output an entry 6 having a high merge rate.

The present example embodiment is also advantageous in a similar manner to the aforementioned first example embodiment, in that it is possible to provide a store merge apparatus and the like, which is capable of reducing the number of times of outputting to the main storage apparatus 211.

A reason for this is that the output unit 150 does not output an entry 6, being data that reflect a store command, to the main storage apparatus 211 until an output command by the output command unit 140 is received. Specifically, the merge unit 130 is able to merge a plurality of store commands to the store buffer 120 which is held until an output command is received.

Third Example Embodiment

Next, a third example embodiment based on the aforementioned second example embodiment is described. In the following, features according to the third example embodiment are mainly described. Constituent elements of the third example embodiment having a similar configuration to the second example embodiment are indicated with same reference numerals as the reference numerals provided in the second example embodiment, and overlapped detailed description on the constituent elements is omitted.

Figure 10:
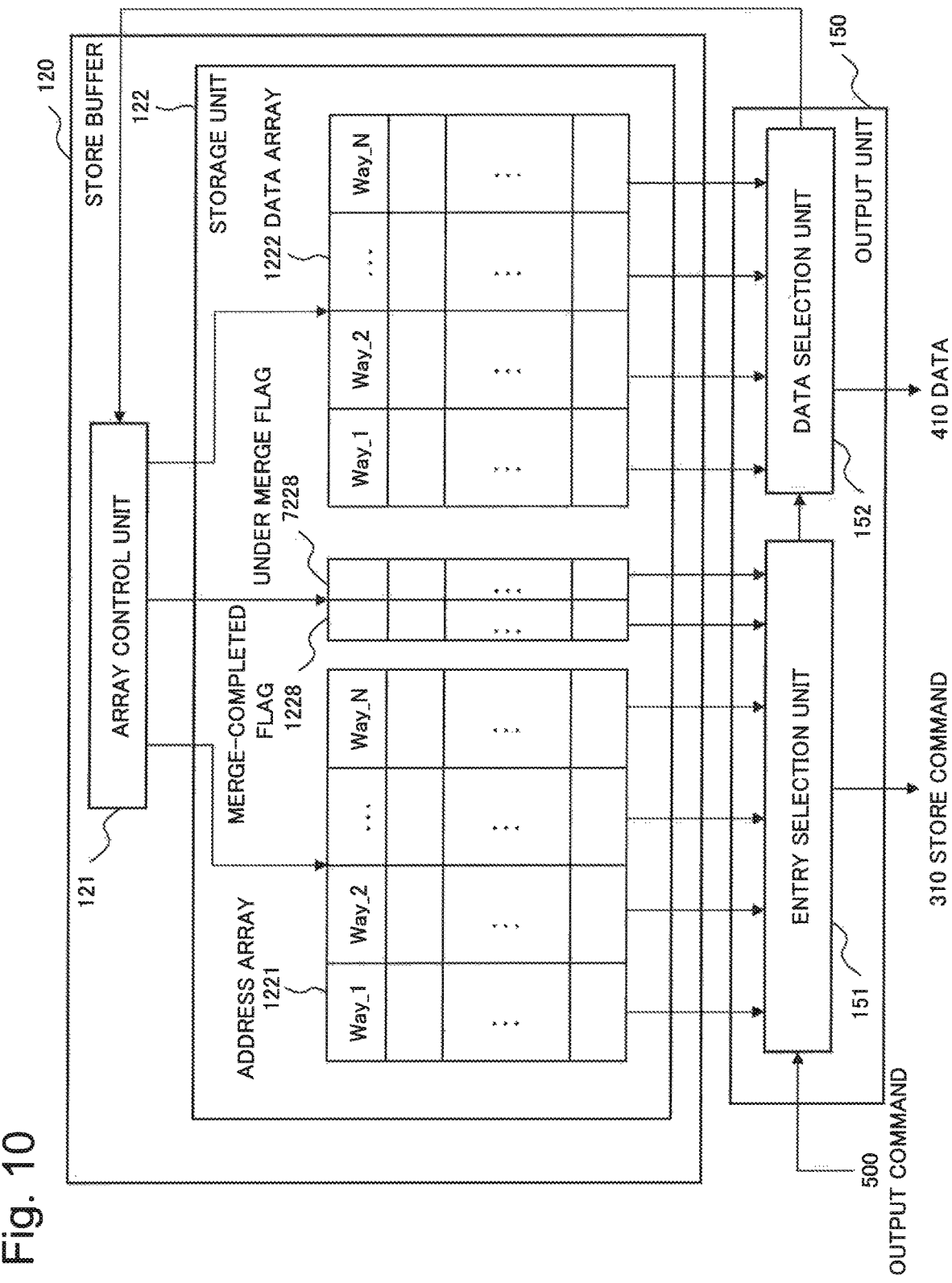
FIG. 10 is a block diagram illustrating a detailed configuration of a store buffer 120 and an output unit 150 in the third example embodiment.

First of all, in the following, a configuration of the present example embodiment is described with reference to FIG. 10. FIG. 10 is a block diagram illustrating a detailed configuration of a store buffer 120 and an output unit 150 in the third example embodiment. A direction of an arrow in the drawing indicates an example, and does not limit a direction of a signal between blocks or a direction of information transmission.

The present example embodiment is a configuration in which the store buffer 120 and the output unit 150 which are illustrated in FIG. 10 are applied to the information processing apparatus 200 in FIG. 2. Specifically, as illustrated in FIG. 2, an information processing apparatus 200 in the present example embodiment includes a central processing apparatus 210, a store merge apparatus 100, and a main storage apparatus 211. A role, a connection relationship, and a data transmitting/receiving relationship and the like of each of the store merge apparatus 100, the central processing apparatus 210, and the main storage apparatus 211 are similar to the second example embodiment, and therefore, detailed description thereof is omitted.

Also in the present example embodiment, the information processing apparatus 200 may be constituted by a general information processing apparatus (computer) which is operated by control of a computer program (software program) to be executed by using the central processing apparatus (CPU) 210. Alternatively, respective units of the information processing apparatus 200 may be constituted by a dedicated hardware device or a logic circuit. A hardware configuration example in which the information processing apparatus 200 is implemented by a computer will be described later with reference to FIG. 11.

Also in the present example embodiment, as illustrated in FIG. 2, the store merge apparatus 100 includes a store buffer 120, a merge unit 130, an output command unit 140, an output unit 150, and a write buffer 160. Referring to FIG. 10, the store buffer 120 in the present example embodiment includes an array control unit 121 and a storage unit 122. The output unit 150 includes an entry selection unit 151 and a data selection unit 152.

The storage unit 122 in the present example embodiment further includes an under merge flag (under merge information) 7228, in addition to an address array 1221, a data array 1222, and a merge-completed flag 1228, and is different from the second example embodiment in that respect. A part of an operation of the merge unit 130 and the entry selection unit 151 is different from the second example embodiment. A configuration and a content of a functional unit and a storage area other than these are similar to the second example embodiment, and therefore, overlapped detailed description thereof is omitted.

The under merge flag (under merge information) 7228 is based on the merge-completed flag 1228 in the second example embodiment. In the present example embodiment, when the under merge flag 7228 is "1", it is indicated that merge-completed blocks of a predetermined number or more are included in line data 610 at an associated row in the address array 1221. It may also be said that the under merge flag 7228 indicates that an entry having a merge rate higher than a predetermined value is included in an associated row. Specifically, in the present example embodiment, the entry merge state information 8 in the first example embodiment is implemented by two flags i.e. the merge-completed flag 1228 and the under merge flag 7228. In the present example embodiment, as a specific example, the under merge flag 7228 is a register of one bit, which is associated with each row in the address array 1221. The under merge flag 7228 may be a storage apparatus other than the address array 1221 and the data array 1222.

In the following, points that operations of the merge unit 130 and the entry selection unit 151 in the present example embodiment are different from the second example embodiment are described.

The merge unit 130 in the present example embodiment is based on the merge unit 130 in the second example embodiment. In the present example embodiment, the merge unit 130 further updates the under merge flag 7228 when the merge-completed flag 1228 is updated, and is different from the second example embodiment in that respect. Specifically, when bits of a predetermined number or more in valid block information 602 becomes "1" (i.e. merged) in a target entry 6 as a result of merge processing, the merge unit 130 sets the under merge flag 7228 to "1" via the array control unit 121.

When an output command 500 is received by the entry selection unit 151, the entry selection unit 151 is able to preferentially select a merge-completed entry, also based on the under merge flag 7228 in addition to the merge-completed flag 1228. Specifically, when a row where the merge-completed flag 1228 is "1" is not present, the entry selection unit 151 selects a row where the under merge flag 7228 is "1". When neither a row where the merge-completed flag 1228 is "1" nor a row where the under merge flag 7228 is "1" is present, the entry selection unit 151 may select a row including any one of valid entries 6 by a predetermined group selecting method.

After outputting an entry 6, the output unit 150 also updates the under merge flag 7228 in addition to the merge-completed flag 1228 in accordance with a result of which the output entry 6 is deleted. For example, when an under merge entry is not present in a row from which an entry 6 is output, the array control unit 121 updates the under merge flag 7228 to "0".

The foregoing is points different from the second example embodiment regarding operations of the merge unit 130 and the entry selection unit 151 in the present example embodiment.

As described above, the present example embodiment is advantageous in that it is possible to enhance control efficiency of the store buffer 120, in addition to the advantageous effects similar to aforementioned second example embodiment.

A reason for this is that the entry selection unit 151 in the present example embodiment is able to select an entry having a merge rate equal to or larger than a predetermined value, based on the under merge flag 7228, when a merge-completed entry is not present. For example, the output unit 150 in the present example embodiment is able to preferentially eject an entry close to merge completion by using the under merge flag 7228, after all merge-completed entries are ejected. This provides an advantage that it is possible to alleviate a reduction in a throughput of the store merge apparatus 100 to the main storage apparatus 211 which is caused by ejecting an entry 6 having a low merge rate.

The respective units illustrated in FIG. 1 to FIG. 3 and FIG. 10 in the aforementioned respective example embodiments may be constituted by independent hardware circuits, respectively, and may be regarded as functional (processing) units (software modules) of a software program. Classification of the respective units illustrated in these drawings is a configuration for convenience of description and various configurations may be presumed when the units are implemented.

An example of a hardware environment in a case as such is described with reference to FIG. 11.

Figure 11:
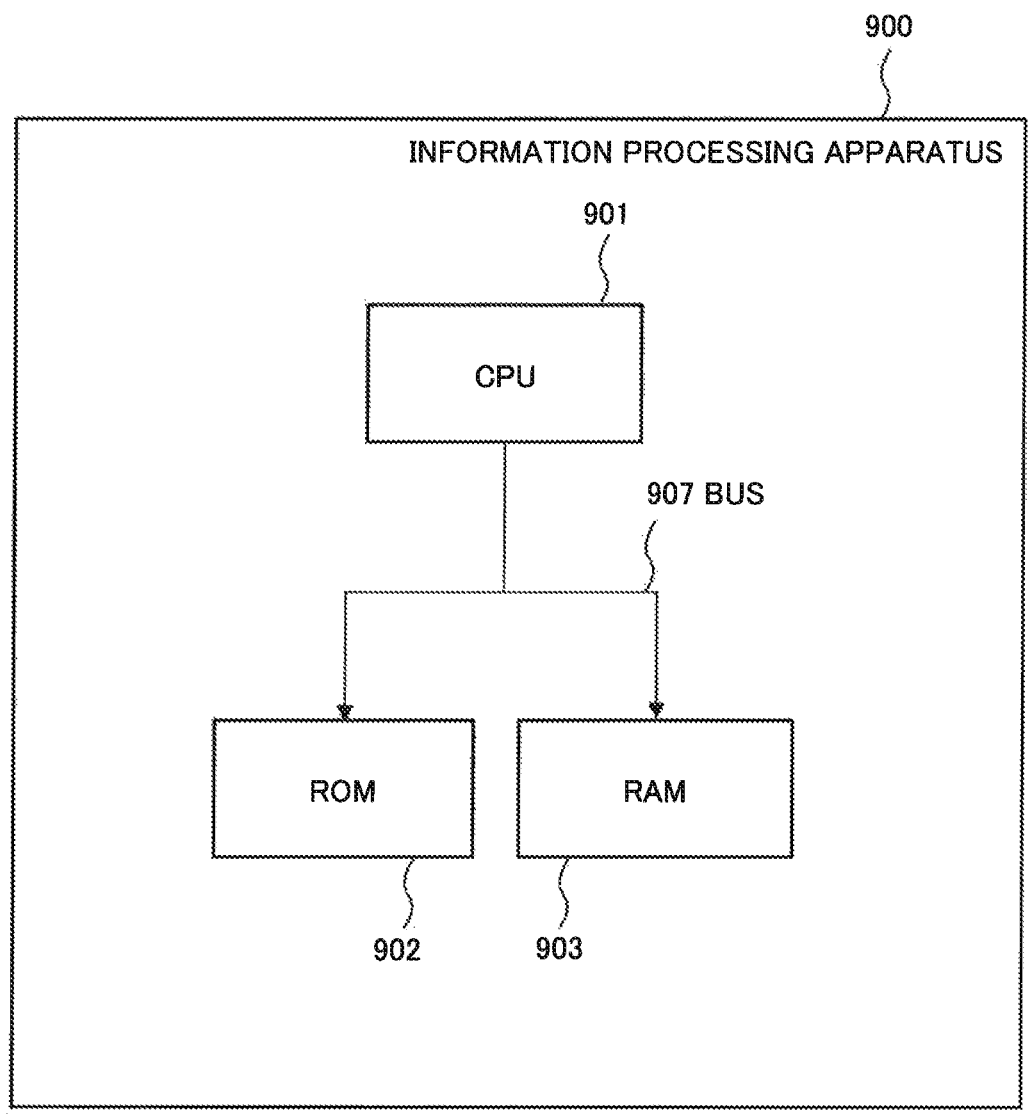
FIG. 11 is a diagram exemplifying a configuration of a computer (information processing apparatus) applicable to a store merge system according to the respective example embodiments of the present invention and modification examples thereof.

FIG. 11 is a diagram exemplifying a configuration of a computer (information processing apparatus) applicable to a store merge system, according to the respective example embodiments of the present invention, and modification examples thereof. Specifically, FIG. 11 illustrates a configuration of a computer capable of implementing at least one of the store merge apparatus 1 and the information processing apparatus 200 in the aforementioned respective example embodiments, and a hardware environment capable of implementing the respective functions in the aforementioned respective example embodiments.

A computer 900 illustrated in FIG. 11 includes a central processing unit (CPU) 901, a read only memory (ROM) 902, and a random access memory (RAM) 903, and has a configuration in which these units are connected via a bus 907.

The present invention described by using the aforementioned respective example embodiments as an example is achieved by reading and executing a computer program on the CPU 901 of the hardware, after the computer program capable of implementing functions in the block configuration diagrams (FIG. 1 to FIG. 3, and FIG. 10) or in the flowcharts (FIG. 7 and FIG. 9) referred to in the description of the respective example embodiments is supplied. The computer program supplied into the computer may be stored in the RAM 903 being a volatile readable/writable storage memory, or in a non-volatile storage device such as the ROM 902.

A part or an entirety of the aforementioned example embodiments may be described as the following supplementary notes, but are not limited to the following supplementary notes.

(Supplementary Note 1)

A store merge apparatus including:

storage means for storing a plurality of entries including a plurality of blocks capable of storing block data, and entry merge state information indicating, for each group into which the plurality of entries are divided, a state of merge in the plurality of entries included in the group, in association with each other;

merge means for executing, based on a store command being received from an external apparatus and instructing writing of data to a storage apparatus, merge processing of storing the data in the entry of the storage means, and updating the entry merge state information associated with a group including an entry serving as a target of the merge processing; and output means for preferentially selecting a group including a merge-completed entry in which the data are stored in all blocks, based on the entry merge state information, further preferentially selecting a merge-completed entry from the selected group, and outputting a selected entry to the storage apparatus.

(Supplementary Note 2)

The store merge apparatus according to supplementary note 1, wherein when a group including the merge-completed entry is not present, the output means selects a group including a valid entry being an entry in which the data are stored, further selects the valid entry from the selected group, and outputs a selected entry to the storage apparatus.

(Supplementary Note 3)

The store merge apparatus according to supplementary note 1 or 2, wherein the entry merge state information includes merge-completed information indicating a group including the merge-completed entry.

(Supplementary Note 4)

The store merge apparatus according to supplementary note 3, wherein the entry merge state information further includes under merge information indicating a group including an under merge entry indicating that the data are stored in blocks of a predetermined number or more, and when a group including the merge-completed entry is not present, the output means selects a group, based on the under merge information, further selects the under merge entry from the selected group, and outputs a selected entry to the storage apparatus.

(Supplementary Note 5)

An information processing apparatus including:

the store merge apparatus according to any one of supplementary notes 1 to 4;

a central processing apparatus for issuing a store command instructing writing of data to the store merge apparatus; and a storage apparatus for storing an entry output from the store merge apparatus.

(Supplementary Note 6)

A store control method including:

receiving a store command instructing writing of data to a storage apparatus;

executing merge processing of storing the data in an entry, based on the store command, with respect to storage means for storing a plurality of entries including a plurality of blocks capable of storing block data, and entry merge state information indicating, for each group into which the plurality of entries are divided, a state of merge in the plurality of entries included in the group, in association with each other;

updating the entry merge state information associated with a group including an entry serving as a target of the merge processing;

preferentially selecting a group including a merge-completed entry in which the data are stored in all blocks, based on the entry merge state information;

further preferentially selecting a merge-completed entry from the selected group; and outputting a selected entry to the storage apparatus.

(Supplementary Note 7)

The store control method according to supplementary note 6, further including:

when a group including the merge-completed entry is not present,
  selecting a group including a valid entry being an entry in which the data are stored;
  further selecting the valid entry from the selected group; and
  outputting a selected entry to the storage apparatus.

(Supplementary Note 8)

The store control method according to supplementary note 6 or 7, wherein the entry merge state information includes merge-completed information indicating a group including the merge-completed entry, and under merge information indicating a group including an under merge entry in which the data are stored in blocks of a predetermined number or more, the store control method further includes:
  based on the merge-completed information,
  selecting a group including a merge-completed entry in which the data are stored in all blocks;
  further preferentially selecting a merge-completed entry from the selected group; and
  outputting a selected entry to the storage apparatus, and
the store control method further includes:
  when a group including the merge-completed entry is not present,
  selecting a group, based on the under merge information;
  further selecting the under merge entry from the selected group; and
  outputting a selected entry to the storage apparatus.

(Supplementary Note 9)

A recording medium recording a computer program causing a computer to execute:

merge processing of receiving a store command instructing writing of data to a storage apparatus, and storing the data in an entry, based on the store command, with respect to storage means for storing a plurality of entries including a plurality of blocks capable of storing block data, and entry merge state information indicating, for each group into which the plurality of entries are divided, a state of merge in the plurality of entries included in the group, in association with each other; and output processing of updating the entry merge state information associated with a group including an entry serving as a target of the merge processing, preferentially selecting a group including a merge-completed entry in which the data are stored in all blocks, based on the entry merge state information, further preferentially selecting a merge-completed entry from the selected group, and outputting a selected entry to the storage apparatus.

(Supplementary Note 10)

The recording medium recording the computer program according to supplementary note 9, wherein, in the output processing, when a group including the merge-completed entry is not present, a group including a valid entry being an entry in which the data are stored is selected, the valid entry is further selected from the selected group, and a selected entry is output to the storage apparatus.

(Supplementary Note 11)

The recording medium recording the computer program according to supplementary note 9 or 10, wherein the entry merge state information includes merge-completed information indicating a group including the merge-completed entry, and under merge information indicating a group including an under merge entry in which the data are stored in blocks of a predetermined number or more, in the output processing, a group including a merge-completed entry in which the data are stored in all blocks is selected, based on the merge-completed information, a merge-completed entry is further preferentially selected from the selected group, and a selected entry is output to the storage apparatus and when a group including the merge-completed entry is not present, a group is selected, based on the under merge information, the under merge entry is further selected from the selected group, and a selected entry is output to the storage apparatus.

In the foregoing, the present invention is described by using the aforementioned example embodiments as exemplary examples. The present invention, however, is not limited to the aforementioned example embodiments. Specifically, the present invention is applicable to various aspects comprehensible to a person skilled in the art within the scope of the present invention.

This application claims the priority based on Japanese Patent Application No. 2015-243209 filed on Dec. 14, 2015, the disclosure of which is incorporated herein in its entirety.

REFERENCE SIGNS LIST 1, 100 Store merge apparatus
2, 122 Storage unit
3, 130 Merge unit
5, 150 Output unit
6 Entry
7 Group
8 Entry merge state information
10 External apparatus
11 Storage apparatus
120 Store buffer
121 Array control unit 1221 Address array
1222 Data array
1228 Merge-completed flag (merge-completed information)
140 Output command unit
151 Entry selection unit
152 Data selection unit
160 Write buffer
200 Information processing apparatus
210 Central processing apparatus
211 Main storage apparatus
300, 301 Store command
350 Command information
360 Address information
361 Address (upper)
362 Address (middle)
363 Address (lower)
400, 401 Data
410 Line data
500 Output command
600 Entry information
601 Line address information
602 Valid block information
610 Line data
7228 Under merge flag (under merge information)
900 Information processing apparatus (computer)
901 CPU
902 ROM
903 RAM
907 Bus

What is claimed is:

1. A store merge apparatus comprising:
storage that stores a plurality of entries including a plurality of blocks capable of storing block data, and entry merge state information indicating, for each group into which the plurality of entries are divided, a state of merge in the plurality of entries included in the group, in association with each other; and
at least one processor
the at least one processor performing operations to:
execute, based on a store command being received from an external apparatus and instructing writing of data to a storage apparatus, merge processing of storing the data in the entry of the storage, and update the entry merge state information associated with a group including an entry serving as a target of the merge processing; and
preferentially select a group including a merge-completed entry in which the data are stored in all blocks, based on the entry merge state information, further preferentially select a merge-completed entry from the selected group, and output a selected entry to the storage apparatus.

2. The store merge apparatus according to claim 1, wherein, the at least one processor further performs operations to:
when a group including the merge-completed entry is not present, select a group including a valid entry being an entry in which the data are stored, further select the valid entry from the selected group, and output a selected entry to the storage apparatus.

3. The store merge apparatus according to claim 1, wherein
the entry merge state information includes merge-completed information indicating a group including the merge-completed entry.

4. The store merge apparatus according to claim 3, wherein
the entry merge state information further includes under merge information indicating a group including an under merge entry in which the data are stored in blocks of a predetermined number or more, and,
the at least one processor further performs operations to:
when a group including the merge-completed entry is not present, select a group, based on the under merge information, further select the under merge entry from the selected group, and output outputs a selected entry to the storage apparatus.

5. A store control method comprising:
receiving a store command instructing writing of data to a storage apparatus;
executing merge processing of storing the data in an entry, based on the store command, with respect to storage storing a plurality of entries including a plurality of blocks capable of storing block data, and entry merge state information indicating, for each group into which the plurality of entries are divided, a state of merge in the plurality of entries included in the group, in association with each other;
updating the entry merge state information associated with a group including an entry serving as a target of the merge processing;
preferentially selecting a group including a merge-completed entry in which the data are stored in all blocks, based on the entry merge state information;
further preferentially selecting a merge-completed entry from the selected group; and
outputting a selected entry to the storage apparatus.

6. The store control method according to claim 5, further comprising:
when a group including the merge-completed entry is not present,
selecting a group including a valid entry being an entry in which the data are stored;
further selecting the valid entry from the selected group; and
outputting a selected entry to the storage apparatus.

7. The store control method according to claim 5, wherein
the entry merge state information includes merge-completed information indicating a group including the merge-completed entry, and under merge information indicating a group including an under merge entry in which the data are stored in blocks of a predetermined number or more,
the store control method further comprises:
based on the merge-completed information,
selecting a group including a merge-completed entry in which the data are stored in all blocks;
further preferentially selecting a merge-completed entry from the selected group; and
outputting a selected entry to the storage apparatus, and
the store control method further comprises:
when a group including the merge-completed entry is not present,
selecting a group, based on the under merge information;
further selecting the under merge entry from the selected group; and
outputting a selected entry to the storage apparatus.

8. A non-transitory computer-readable recording medium recording a computer program causing a computer to execute:
merge processing of receiving a store command instructing writing of data to a storage apparatus, and storing the data in an entry, based on the store command, with respect to storage storing a plurality of entries including a plurality of blocks capable of storing block data, and entry merge state information indicating, for each group into which the plurality of entries are divided, a state of merge in the plurality of entries included in the group, in association with each other; and output processing of updating the entry merge state information associated with a group including an entry serving as a target of the merge processing, preferentially selecting a group including a merge-completed entry in which the data are stored in all blocks, based on the entry merge state information, further preferentially selecting a merge-completed entry from the selected group, and outputting a selected entry to the storage apparatus.

9. The non-transitory computer-readable recording medium recording the computer program according to claim 8, wherein, in the output processing, when a group including the merge-completed entry is not present, a group including a valid entry being an entry in which the data are stored is selected, the valid entry is further selected from the selected group, and a selected entry is output to the storage apparatus.

10. The non-transitory computer-readable recording medium recording the computer program according to claim 8, wherein the entry merge state information includes merge-completed information indicating a group including the merge-completed entry, and under merge information indicating a group including an under merge entry in which the data are stored in blocks of a predetermined number or more, in the output processing, a group including a merge-completed entry in which the data are stored in all blocks is selected, based on the merge-completed information, a merge-completed entry is further preferentially selected from the selected group, and a selected entry is output to the storage apparatus, and, when a group including the merge-completed entry is not present, a group is selected, based on the under merge information, the under merge entry is further selected from the selected group, and a selected entry is output to the storage apparatus.

\* \* \* \* \*